United States Patent
Niinobe et al.

(10) Patent No.: US 9,222,063 B2
(45) Date of Patent: Dec. 29, 2015

(54) EXTRUSION OR INJECTION MOLDING MACHINE PURGING COMPOSITION AND METHOD

(71) Applicant: SHIN-ETSU CHEMICAL CO., LTD., Tokyo (JP)

(72) Inventors: Shingo Niinobe, Joestsu (JP); Kazuhisa Hayakawa, Joestsu (JP); Fumie Kusaki, Joestsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/086,435

(22) Filed: Nov. 21, 2013

(65) Prior Publication Data

US 2014/0142018 A1    May 22, 2014

(30) Foreign Application Priority Data

Nov. 22, 2012 (JP) ................................. 2012-256452

(51) Int. Cl.
| | | |
|---|---|---|
| *C11D 7/50* | (2006.01) | |
| *C11D 3/43* | (2006.01) | |
| *B29C 47/08* | (2006.01) | |
| *C11D 3/22* | (2006.01) | |
| *C11D 7/26* | (2006.01) | |
| *C11D 7/32* | (2006.01) | |
| *C11D 11/00* | (2006.01) | |

(52) U.S. Cl.
CPC ............ *C11D 7/5022* (2013.01); *B29C 47/0877* (2013.01); *B29C 47/0881* (2013.01); *C11D 3/222* (2013.01); *C11D 3/225* (2013.01); *C11D 7/261* (2013.01); *C11D 7/3218* (2013.01); *C11D 11/0041* (2013.01)

(58) Field of Classification Search
CPC ............ C11D 11/007; C11D 11/0041; C11D 11/0011; C11D 11/0005; C11D 7/5004; C11D 7/50; C11D 3/2003; C11D 3/2041; C11D 3/2065; C11D 3/2068; C11D 3/43; C11D 7/329
See application file for complete search history.

(56) References Cited

U.S. PATENT DOCUMENTS

| | | | |
|---|---|---|---|
| 6,444,634 B1 * | 9/2002 | Mason et al. .................. | 510/376 |
| 6,497,905 B1 * | 12/2002 | Vladyka et al. ............... | 424/502 |
| 2007/0078071 A1 * | 4/2007 | Lee et al. ...................... | 510/130 |
| 2011/0094540 A1 | 4/2011 | Morken et al. | |
| 2012/0003311 A9 * | 1/2012 | Yoshitake et al. ............ | 424/470 |

FOREIGN PATENT DOCUMENTS

| | | |
|---|---|---|
| DE | 1029558 B | 5/1958 |
| JP | 2-308900 A | 12/1990 |
| JP | 5-42546 A | 2/1993 |
| JP | 2000-34499 A | 2/2000 |
| JP | 2006-123173 A | 5/2006 |

OTHER PUBLICATIONS

The Search Report, dated Mar. 21, 2014, issued in the corresponding European Patent Application No. 13194133.8.

* cited by examiner

*Primary Examiner* — Charles Boyer
(74) *Attorney, Agent, or Firm* — Birch, Stewart, Kolasch & Birch, LLP

(57) ABSTRACT

A composition comprising 10-80% by weight of a cellulose ether and a solvent selected from a water-soluble polyhydric alcohol, polyhydric alcohol ether, polyhydric alcohol ester, and ethanolamine is effective for purging extrusion and injection molding machines. The purging composition exerts a satisfactory purging or cleaning effect, but little abrasion effect, thus avoiding any abrasion of machine internal components by purging. Even if part of the purging composition is left within the machine after the composition is discharged out, the residue can be readily removed.

8 Claims, 1 Drawing Sheet

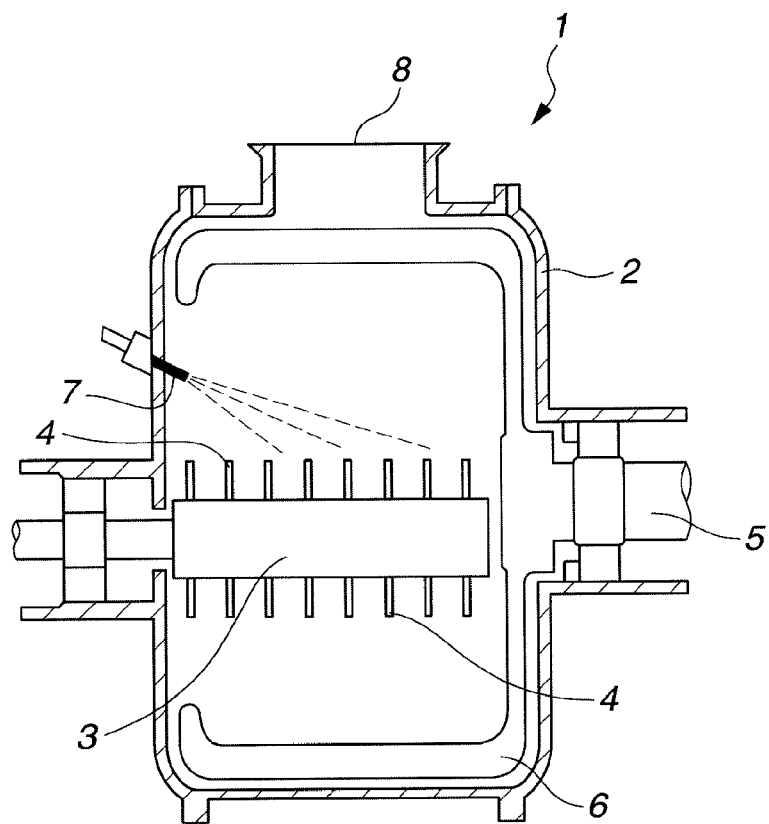

EXTRUSION OR INJECTION MOLDING MACHINE PURGING COMPOSITION AND METHOD

CROSS-REFERENCE TO RELATED APPLICATION

This non-provisional application claims priority under 35 U.S.C. §119(a) on patent application No. 2012-256452 filed to in Japan on Nov. 22, 2012, the entire contents of which are hereby incorporated by reference.

TECHNICAL FIELD

This invention relates to a purging composition for cleaning extrusion and injection molding machines used in building, industrial and pharmaceutical applications by removing any residues like thermoplastic resins and additives in the machines, and a method for cleaning extrusion and injection molding machines.

BACKGROUND ART

While extrusion and injection molding machines are used for resin molding, it is sometimes necessary to clean the interior of the machine. For example, after a molding machine is used to mold a certain material, the molding material is changed and molded in the same machine. In this case, some of the previous molding material is left in the molding machine. Thus, if the new material is molded in the molding machine as such, the residue is incorporated in the new material as impurity. Molded parts of the new material are deteriorated in quality or even become outside the quality standards. For this reason, the interior of the molding machine must be cleaned before the molding material is changed.

A problem arises even when a common molding material is continuously molded. If part of the material stagnates within the machine for a long time without being discharged out, that material can be carbonized by the thermal history during the time, indicating that carbide is left in the molding machine. If such carbide resides in the molding machine, problems arise as in the above case, for example, molded parts are deteriorated in quality. Therefore, even in continuous molding of a common material, the molding machine is desirably cleaned at regular intervals.

In the prior art, cleaning of the molding machine interior is implemented by disassembling the machine. Since the disassembly of the machine is time and labor consuming and causes a substantial reduction of productivity, it would be desirable to develop a purging agent with which the molding machine interior can be cleaned simply by introducing the agent into the machine and performing ordinary operation. For example, the following purging agents are known in the art.

Patent Document 1 discloses a molding machine purging composition comprising 70 to 95% by weight of a thermoplastic resin and 30 to 5% by weight of glass fibers. Patent Document 2 describes a molding machine purging agent comprising a thermoplastic resin and a fibrous filler having a length of at least 2 mm such as glass fibers and carbon fibers. Patent Document 3 describes that a thermoplastic resin composition comprising a thermoplastic resin, an organic filler of a specific size such as wood meal, and a lubricant is an effective purging agent for molding machines.

However, these purging agents are still unsatisfactory. While inorganic fillers such as glass fibers are used in Patent Document 1, they are known to function to abrade internal components of the molding machine. If the purging agent with a high loading of inorganic filler is used for a long period of time, screws, cylinders and other components can be abraded. The purging agent of Patent Document 2 also has a risk that screws, cylinders and other components can be abraded since glass fibers are used as in Patent Document 1. The purging agent of Patent Document 3 contains wood meal, which is not melted upon heating. At the end of purging operation, wood meal is left in the molding machine along with the thermoplastic resin, and removal of the wood meal and resin is quite difficult.

CITATION LIST

Patent Document 1: JP-A H02-308900
Patent Document 2: JP-A H05-042546
Patent Document 3: JP-A 2000-034499

DISCLOSURE OF INVENTION

An object of the invention is to provide a purging composition which when applied to extrusion and injection molding machines, exerts a satisfactory purging or cleaning effect, but little abrasion effect, thus avoiding any abrasion of machine internal components by purging, and which even if part of the purging composition is left within the machine after the purging composition is discharged out, ensures easy removal of the residue. Another object is to provide a method of cleaning extrusion and injection molding machines.

The inventors have found that a purging composition obtained by mixing at least 10% by weight of a cellulose ether with a solvent selected from a water-soluble polyhydric alcohol, polyhydric alcohol ether, polyhydric alcohol ester, and ethanolamine, or by heating and melting them, cooling the solution for solidification, and grinding the solid is effective for cleaning extrusion and injection molding machines. The composition exerts a satisfactory purging or cleaning effect, but little abrasion effect, thus avoiding any abrasion of machine internal components by purging. Even if part of the purging composition is left within the machine after the composition is discharged out, removal of the residue is easy. The invention is predicated on this finding.

In one aspect, the invention provides a purging composition for extrusion and injection molding machines, comprising a cellulose ether and at least one solvent selected from the group consisting of a water-soluble polyhydric alcohol, polyhydric alcohol ether, polyhydric alcohol ester, and ethanolamine, the cellulose ether being present in the solvent in a concentration of at least 10% by weight.

Preferably, the purging composition is prepared by heating and melting the cellulose ether in the solvent, cooling the solution for solidification, and grinding the solid.

In preferred embodiments, the cellulose ether is an alkyl cellulose, hydroxyalkyl cellulose, hydroxyalkyl alkyl cellulose or stearyl ether thereof, or cellulose-based enteric substrate; the water-soluble polyhydric alcohol is ethylene glycol, propylene glycol, diethylene glycol, dipropylene glycol, 1,3-propanediol or glycerol; the water-soluble polyhydric alcohol ether is ethylene glycol ethyl ether or tripropylene glycol methyl ether; the water-soluble polyhydric alcohol ester is ethylene glycolate, glyceryl monoacetate or glyceryl diacetate; the water-soluble ethanolamine is monoethanolamine or diethanolamine.

In another aspect, the invention provides a method for cleaning an extrusion or injection molding machine by removing a contaminant therefrom, comprising the step of extrusion or injection molding a purging composition through the machine at a temperature equal to or higher than the melting point of the contaminant, the purging composition comprising a cellulose ether and at least one solvent selected from the group consisting of a water-soluble polyhydric alcohol, polyhydric alcohol ether, polyhydric alcohol ester, and ethanolamine.

Advantageous Effects of Invention

When applied to an extrusion or injection molding machine, the purging composition exerts a satisfactory purging or cleaning effect, but little abrasion effect, thus avoiding any abrasion of machine internal components by purging. Even if part of the purging composition is left within the machine after the composition is discharged out, the residue can be readily removed.

BRIEF DESCRIPTION OF DRAWING

FIG. 1 is a schematic cross-sectional view of an exemplary agitation mixer used in the practice of the invention.

DESCRIPTION OF PREFERRED EMBODIMENTS

In one embodiment, the purging composition for extrusion and injection molding machines is defined as comprising a cellulose ether and at least one solvent selected from among a water-soluble polyhydric alcohol, polyhydric alcohol ether, polyhydric alcohol ester, and ethanolamine.

The water-soluble solvent is one or more solvents selected from among water-soluble polyhydric alcohols, polyhydric alcohol ethers, polyhydric alcohol esters, and ethanolamines. Any of these solvents may be used as long as the cellulose ether is melted therein on heating.

The polyhydric alcohols are preferably those having a molecular weight of up to 300, more preferably up to 150, and examples include ethylene glycol, propylene glycol, diethylene glycol, dipropylene glycol, 1,3-propanediol and glycerol. The polyhydric alcohol ethers are preferably monoethers, diethers and triethers of monofunctional aliphatic compounds having 1 to 6 carbon atoms, especially 1 to 4 carbon atoms, and examples include ethylene glycol ethyl ether and tripropylene glycol methyl ether. The polyhydric alcohol esters are preferably monoesters, diesters and triesters of monofunctional aliphatic carboxylic acids having 1 to 6 carbon atoms, especially 1 to 4 carbon atoms, and examples include ethyl glycolate, glyceryl monoacetate or glyceryl diacetate. Suitable ethanolamines include monoethanolamine and diethanolamine.

The cellulose ether used herein is preferably selected from among alkyl celluloses, hydroxyalkyl celluloses, hydroxyalkyl alkyl celluloses or stearyl ethers thereof, and cellulose-based enteric substrates such as hydroxyalkyl alkyl cellulose acetate succinates and hydroxyalkyl alkyl cellulose phthalates. Inter alia, alkyl celluloses, hydroxyalkyl celluloses, hydroxyalkyl alkyl celluloses, hydroxyalkyl alkyl cellulose stearoxy ethers, and cellulose-based enteric substrates are preferred. Most preferred among others are methyl cellulose (MC), hydroxypropyl methyl cellulose (HPMC), hydroxyethyl methyl cellulose (HEMC), hydroxyethyl ethyl cellulose (HEEC), hydroxypropyl cellulose (HPC), hydroxyethyl cellulose (HEC), hydroxypropyl methyl cellulose acetate succinate (HPMCAS), and hydroxypropyl methyl cellulose phthalate.

Illustrative examples include alkyl celluloses such as methyl cellulose (MC) having a methoxyl content of 10 to 40 wt %; hydroxyalkyl celluloses such as hydroxypropyl cellulose (HPC) having a hydroxypropoxyl content of 40 to 70 wt % and hydroxylethyl cellulose (HEC) having a hydroxyethoxyl content of 30 to 70 wt %; hydroxyalkyl alkyl celluloses such as hydroxypropyl methyl cellulose (HPMC) or hydroxyethyl methyl cellulose (HEMC) having a methoxyl content of 10 to 40 wt % and a hydroxyalkyl content of 3 to 30 wt % and hydroxyethyl ethyl cellulose (HEEC) having an ethoxyl content of 5 to 20 wt % and a hydroxyethoxyl content of 10 to 45 wt %; hydroxylpropyl cellulose stearoxyether having a stearyloxyhydroxypropoxyl content of 0.2 to 0.6 wt %, hydroxypropyl methyl cellulose acetate succinate (HPMCAS) having an acetyl content of 5 to 14 wt %, a succinoyl content of 4 to 18 wt %, a methoxyl content of 20 to 26 wt % and a hydroxypropoxyl content of 5 to 10 wt % and hydroxypropyl methyl cellulose phthalate having a carboxybenzoyl content of 21 to 35 wt %, a methoxyl content of 18 to 24 wt %, and a hydroxypropoxyl content of 5 to 10 wt %. These cellulose ethers may be used alone or in admixture of two or more.

A degree of substitution may be determined according to the Zeisel-GC method described in J. G. Gobler, E. P. Samsel and G. H. Beaber, Talanta, 9, 474 (1962).

For the cellulose ether used herein, a higher weight average molecular weight is preferred to gain hardness in the gel state whereas a lower weight average molecular weight is preferred to gain fluidity in the gel state. Provided that a viscosity of a 2 wt % aqueous solution as measured at 20° C. by Ubbelohde's viscometer according to JIS K2283-1993 is an index corresponding to the weight average molecular weight of cellulose ether, those cellulose ethers having a viscosity of at least 3 mPa·s, especially at least 40 mPa·s are desirable. The upper limit of viscosity is desirably up to 300,000 mPa·s.

The concentration of cellulose ether in the solvent is not particularly limited as long as the cellulose ether can melt in the solvent upon heating and form a gel upon cooling. It is desirable for the object of the invention that a high concentration of cellulose ether form a gel. It is desirable from this standpoint that the concentration of cellulose ether in the solvent be at least 10% by weight, preferably 20 to 80% by weight, and more preferably 40 to 70% by weight. If cellulose ether is present in excess, part thereof may not melt even upon heating.

The purging composition of the invention may be either (i) a mixture obtained by mixing and dispersing the cellulose ether and the solvent near room temperature (0° C. to 40° C.) or (ii) a product obtained by mixing and dispersing the cellulose ether and the solvent, heating the mixture so that the nonionic cellulose ether is melted in the solvent, cooling the solution down to near room temperature (0° C. to 50° C.) for solidification, and grinding the solid.

A mixer is used for mixing and dispersing the cellulose ether and the solvent. Suitable mixers include spray mixers, typically Spartan Granulator (Dalton Co., Ltd.), Flexomix (Hosokawa Micron Corp.), ploughshare type mixers (Lodige GmbH and Pacific Machinery & Engineering Co., Ltd.), Nauta mixers such as Hi-Blender, cone type blenders, and V blenders. Inter alia, a spray mixer is preferred since it ensures that the solvent is uniformly added to cellulose ether (typically alkyl cellulose) to form a uniform dispersion.

FIG. 1 illustrates one exemplary agitation mixer which is advantageously used in the practice of the invention and commercially available under the trade name of Spartan Granulator from Dalton Co., Ltd. The mixer generally designated at 1 includes a tank 2. A first rotating shaft (or rotor) 3 is rotatably mounted in the tank 2 and horizontally extended inward from a portion of one side wall of the tank 2 which is disposed near the center in height direction. The rotor 3 is provided with a plurality of impeller pins 4 projecting radially from its outer periphery. The rotor 3 is rotated in one direction by a drive (not shown) such as a motor while the impeller pins 4 are integrally rotated in the same direction. A second rotating shaft 5 is rotatably mounted in the tank 2 at another side wall and opposed to the rotor 3. The second rotating shaft 5 is rotated in a direction opposite to the rotor 3 (i.e., counter-rotated) by a drive (not shown) such as a motor. The second rotating shaft 5 is provided with ribbon or cage-shaped mixing arms 6 which each extend radially along the inside of the other side wall and axially along the top and bottom walls of the tank 2. As the second rotating shaft 5 is counter-rotated, the arms 6 are integrally rotated in the opposite direction. A two-fluid nozzle 7 is provided in one sidewall of the tank for feeding compressed air and the solvent into the tank. The tank 2 includes an inlet 8 at the top for feeding the cellulose ether.

The cellulose ether particles are fluidized at a suitable rate. An agitation mixer is like Spartan Granulator as shown in FIG. 1, in which a rotor with a plurality of impeller pins is horizontally mounted at the center of the tank. Provided that the mixer tank has a diameter of 250 mm and a volume of 2 liters and is charged with 0.5 kg of cellulose ether particles, the rotor with impeller pins is preferably rotated at 1,500 to 10,000 rpm, more preferably 2,000 to 7,000 rpm. If the rotational speed is too low, the solvent may not come in uniform contact with the cellulose ether. If the rotational speed is too high, the impeller pins may be severely worn and the mixer be damaged.

It is desirable to use an agitation mixer having a first horizontal shaft with radial impeller pins and a second horizontal shaft with ribbon or cage-shaped mixing arms which enclose the impeller pins and rotate around the impeller pins in a counter direction, as illustrated in FIG. 1. While powder particles are agitated and fluidized by the impeller pins rotating at a high speed, the arms create countercurrent flows. Then the overall fluid is uniformly agitated in the tank without stagnation. For this reason, the provision of a second shaft with ribbon or cage-shaped arms which turn around the impeller pins in a counter direction is desirable.

The second shaft with arms is preferably counter-rotated at 10 to 1,000 rpm, more preferably 20 to 100 rpm. If the rotational speed is too low, some portions of powder may stagnate. If the rotational speed is too high, particles impinge against each other too fast, allowing for pulverizing action.

Typically a two-fluid nozzle depicted at 7 in FIG. 1 is used as the means for adding the solvent to the cellulose ether. As to the structure of a two-fluid nozzle, the nozzle includes a central nozzle for injecting the solvent and an outer nozzle enclosing the central nozzle for injecting compressed air. Then the solvent is carried by compressed air and injected or sprayed to surfaces of cellulose ether particles. The two-fluid nozzle preferably has an injection angle of 30° to 110°, more preferably 45° to 100°, and even more preferably 50° to 80°. If the angle of the two-fluid nozzle is outside the range of 30° to 110°, the solvent may attach to the inner wall, impeller pins and/or arms of the mixer rather than cellulose ether particles.

The solvent is preferably fed at a rate of 1 to 500 g/min, more preferably 2 to 20 g/min. If the feed rate is too low, a longer time may be necessary until the desired product is obtained, leading to low productivity. If the feed rate is too high, the solvent may not uniformly attach to cellulose ether particles.

When the solvent is sprayed as droplets and added to the cellulose ether particles, the average diameter of droplets is preferably smaller than the average particle size of the cellulose ether. Specifically the average diameter of sprayed droplets is up to 1/10, preferably up to 1/50 of the average particle size of cellulose ether. If the average diameter of droplets is too large, it may be difficult to achieve uniform addition to all cellulose ether particles in fluidized state. It is noted that the average diameter of droplets is measured by a particle size measurement system based on laser diffractometry.

When the purging composition in chip form (ii) is desired, the heating temperature for melting the cellulose ether in the solvent should desirably be equal to or lower than the boiling point of the solvent. Although the temperature varies somewhat with the type of both the solvent and the cellulose ether used, it is preferably lower than the boiling point of the solvent by 10 to 70° C., more preferably by 10 to 40° C.

The purging composition in form (ii) is obtained by heating, melting and extruding the mixture in a hot-melt extruder (MiniLab by Thermo Fisher Scientific Inc.) and cooling the extrudate in a room temperature atmosphere down to near normal temperature (0° C. to 50° C.) for solidification. During the cooling step following the dispersing, mixing, heating and melting step, an additive may be added in such an amount as not to inhibit formation of the composition. The additive used herein is preferably one having no or minimum water content. Exemplary additives include pigments and dyes, inorganic materials such as cements, alumina, inorganic hydroxides (e.g., aluminum hydroxide and magnesium hydroxide), and clay materials (e.g., bentonite, talc and kaolin), and organic materials which are hardly melted at the heating temperature.

The purging composition in form (ii) is characterized in that it resumes solution form when heated again to the temperature region used for melting. This purging composition can be handled as solid at the service temperature, i.e., normal temperature of 0° C. to 50° C., and is miscible with water or another solvent like solutions. The solid thus obtained can be worked into a form readily usable as the purging composition, for example, by pelletizing on a cutter into pellets for ease of melting on use as the purging composition. By further grinding to a particulate or powder form, particle size adjustment is possible. For the grinding purpose, a jet mill, roller mill, ball mill, knife mill, mesh mill or cutter mill may be used, with the cutter mill capable of grinding at relatively low temperature being preferred. If the mill becomes hot, grinding may be performed while blowing cold air.

The method of cleaning an extrusion or injection molding machine using the purging composition thus obtained is carried out in the same manner as the normal extrusion or injection molding operation except that the purging composition is used instead of the proper resin to be extrusion or injection molded. The temperature during the purging step is preferably equal to or higher than the melting point of the resin (which remains in the machine and is to be removed) and equal to or lower than the boiling point of the solvent and specifically in the range of 100 to 230° C. more specifically 110 to 180° C.

Examples of the resin to be purged or removed include polyolefin resins such as polyethylene and polypropylene, chlorinated resins such as vinyl chloride and vinylidene chloride, polystyrene, polyphenylene oxide, polyamide resins, fluoro-resins such as polytetrafluoroethylene, cellulose derivatives such as acetyl cellulose and nitrocellulose, and vinyl resins such as polyvinyl alcohol.

EXAMPLE

Examples are given below by way of illustration and not by way of limitation.

Examples 1 to 16

There was provided an agitation mixer including a mixing tank, a horizontal rotor disposed at the tank center and having impeller pins, and a horizontal counter-rotating shaft opposed to the rotor and having ribbon-shaped mixing arms which surround the pins and turn around the pins. It is commercially available under the trade name of Spartan Granulator RMO-4H (working volume 2 L) from Dalton Co., Ltd. To the mixer, 0.5 kg of a cellulose ether as shown in Table 1 (having a viscosity and substituent as shown in Table 2) was fed. The rotor with impeller pins was rotated at 4,700 rpm, and the ribbon-shaped mixing arms were counter-rotated around the rotor pins at 25 rpm, thereby keeping cellulose ether particles in the fluidized state for 1 minute.

Next, 100 g of a solvent as shown in Table 1 was fed to the mixer and sprayed through a two-fluid nozzle along with compressed air at 20° C., a pressure of 0.03 MPa and a feed rate of 15 g/min. In this way, the solvent was sprayed onto surfaces of cellulose ether particles so that the cellulose ether might be present in a concentration as shown in Table 1.

The purging composition consisting of spray treated cellulose ether particles was admitted into a hot-melt extruder (HAAKE MiniLab II by Thermo Fisher Scientific Inc.) for purging any residual resin material (to be described below) out of the extruder. Specifically, after a molding compound consisting of 100 parts by weight of zirconia powder and 18 parts by weight of a polyacrylic binder (trade name Ceramo IB-27 by Dai-Ichi Kogyo Seiyaku Co., Ltd.) was molded at 150° C., some resin compound was left in the extruder. The purging composition was applied to remove this residual resin. Since the resin to be removed melted at 150° C., the purging temperature was set equal to or higher than the melting point of both the contaminant to be removed and the purging composition, as shown in Table 1. The purging composition was extrusion molded at the temperature and a discharge rate of 20 cm/min into a sheet of 5 mm wide and 2 mm thick along with the residual resin. Two minutes after the extrudate was no longer discharged, the lid of the melt extruder was opened for inspecting the purging composition which was left in the extruder. The remaining purging composition was taken out and weighed to be less than 1 g, demonstrating that the extruder could be fully cleaned simply after rinsing without abrasion of the extruder parts.

Examples 17 and 18

As in Examples 1 to 16, 100 g of a solvent as shown in Table 1 was sprayed onto surfaces of particulate cellulose ether having a viscosity and substituent as shown in Table 2 so as to provide a cellulose ether concentration as shown in Table 1, except that a mixture of two cellulose ethers was used.

The purging composition consisting of spray coated cellulose ether particles was admitted into a hot-melt extruder (HAAKE MiniLab II) for purging any residual compound (to be described below) out of the extruder. Specifically, after a 1:2 powder mixture of nifedipine (Daito Co., Ltd.) and hydroxypropyl methyl cellulose acetate succinate (HPMCAS) (AQOAT by Shin-Etsu Chemical Co., Ltd.) was molded at 160° C., some mixture was left in the extruder. The purging composition was applied to remove this residual compound. Since the compound to be removed melted at 160° C., the purging temperature was set equal to or higher than the melting point of both the contaminant to be removed and the purging composition, as shown in Table 1. The purging composition was extrusion molded at the temperature and a discharge rate of 20 cm/min into a sheet of 5 mm wide and 2 mm thick along with the residual compound. Two minutes after the extrudate was no longer discharged, the lid of the melt extruder was opened for inspecting the purging composition which was left in the extruder. The remaining purging composition was taken out and weighed to be less than 1 g, demonstrating that the extruder could be fully cleaned simply after rinsing without abrasion of the extruder parts.

Examples 19 to 34

As in Examples 1 to 16, 100 g of a solvent as shown in Table 3 was sprayed onto surfaces of particulate cellulose ether having a viscosity and substituent as shown in Table 2 so as to provide a cellulose ether concentration as shown in Table 3.

The purging composition consisting of spray coated cellulose ether particles was admitted into a hot-melt extruder (HAAKE MiniLab II by Thermo Fisher Scientific Inc.) and extrusion molded at a temperature as shown in Table 3 and a discharge rate of 20 cm/min into a sheet of 5 mm wide and 2 mm thick.

The sheet was then placed in a melt extruder (Capilograph E-3B by Toyo Seiki Seisakusho, Ltd.) at a heating temperature as shown in Table 3, held therein for 5 minutes, and extruded at a discharge rate of 50 cm/min into a rod having a diameter of 1 mm. The rod was cooled to a chip-forming temperature as shown in Table 3 and chopped by a digital cutter (ZKC-16T by I TEC Corp.) into chips of 1 mm diameter and about 1 mm long.

The purging composition in chip form was admitted into a hot-melt extruder (HAAKE MiniLab II) for purging any residual resin material (to be described below) out of the extruder. Specifically, after a molding compound consisting of 100 parts by weight of zirconia powder and 18 parts by weight of a polyacrylic binder (trade name Ceramo IB-27 by Dai-Ichi Kogyo Seiyaku Co., Ltd.) was molded at 150° C., some resin compound was left in the extruder. The purging composition was applied to remove this residual resin. Since the resin to be removed melted at 150° C., the purging temperature was set equal to or higher than the melting point of both the contaminant to be removed and the purging composition, as shown in Table 3. The purging composition was extrusion molded at the temperature and a discharge rate of 20 cm/min into a sheet of 5 mm wide and 2 mm thick along with the residual resin. Two minutes after the extrudate was no longer discharged, the lid of the melt extruder was opened for inspecting the purging composition which was left in the extruder. The remaining purging composition was taken out and weighed to be less than 1 g, demonstrating that the extruder could be fully cleaned simply after rinsing without abrasion of the extruder parts.

Examples 35 and 36

As in Examples 1 to 16, 100 g of a solvent as shown in Table 3 was sprayed onto surfaces of particulate cellulose ether having a viscosity and substituent as shown in Table 2 so as to provide a cellulose ether concentration as shown in Table 3, except that a mixture of two cellulose ethers was used.

As in Examples 19 to 34, the purging composition consisting of spray coated cellulose ether particles was worked into chips. The purging composition in chip form was admitted into a hot-melt extruder (HAAKE MiniLab II) for purging any residual compound (to be described below) out of the extruder. Specifically, after a 1:2 powder mixture of nifedipine (Daito Co., Ltd.) and HPMCAS (AQOAT by Shin-Etsu Chemical Co., Ltd.) was molded at 160° C., some compound was left in the extruder. The purging composition was applied to remove this residual compound. Since the compound to be removed melted at 160° C., the purging temperature was set equal to or higher than the melting point of the contaminant to be removed and the purging composition, as shown in Table 3. The purging composition was extrusion molded at the temperature and a discharge rate of 20 cm/min into a sheet of 5 mm wide and 2 mm thick along with the residual compound. Two minutes after the extrudate was no longer discharged, the lid of the melt extruder was opened for inspecting the purging composition which was left in the extruder. The remaining purging composition was taken out and weighed to be less than 1 g, demonstrating that the extruder could be fully cleaned simply after rinsing without abrasion of the extruder parts.

TABLE 1

| Example | Solvent Type | Solvent boiling point (° C.) | Cellulose ether Type | Cellulose ether Concentration (wt %) | Form before admission | Purging temperature (° C.) |
|---|---|---|---|---|---|---|
| 1 | propylene glycol | 188 | A | 60 | powder | 160 |
| 2 | propylene glycol | 188 | B | 40 | powder | 170 |
| 3 | propylene glycol | 188 | C | 50 | powder | 170 |
| 4 | propylene glycol | 188 | D | 70 | powder | 150 |
| 5 | propylene glycol | 188 | E | 80 | powder | 150 |
| 6 | propylene glycol | 188 | F | 70 | powder | 150 |
| 7 | ethylene glycol | 197 | A | 60 | powder | 170 |
| 8 | ethylene glycol | 197 | C | 60 | powder | 180 |
| 9 | diethylene glycol | 245 | A | 60 | powder | 210 |
| 10 | diethylene glycol | 245 | B | 40 | powder | 210 |
| 11 | 1,3-propane diol | 214 | H | 70 | powder | 180 |
| 12 | glycerol | 290 | G | 50 | powder | 260 |
| 13 | tripropylene glycol methyl ether | 243 | J | 70 | powder | 210 |
| 14 | ethyl glycolate | 160 | J | 70 | powder | 150 |
| 15 | monoethanolamine | 172 | I | 70 | powder | 150 |
| 16 | diethanolamine | 269 | D | 60 | powder | 230 |
| 17 | propylene glycol | 188 | D:K = 60:10 | 70 | powder | 170 |
| 18 | propylene glycol | 188 | D:L = 60:10 | 70 | powder | 160 |

TABLE 2

| | | | Cellulose ether | | | | | |
| | | | | Substituent*3 (wt %) | | | | |
| | Type*1 | Viscosity*2 (mPa·s) | MeO | HPO | HEO | EtO | Acetyl | Succinoyl |
|---|---|---|---|---|---|---|---|---|
| A | HPMC | 4,000 | 29 | 9 | — | — | — | — |
| B | HEMC | 200,000 | 23 | — | 12 | — | — | — |
| C | MC | 8,000 | 30 | — | — | — | — | — |
| D | HPMC | 50 | 29 | 9 | — | — | — | — |
| E | HPMC | 3 | 29 | 9 | — | — | — | — |
| F | HPC | 8 | — | 63 | — | — | — | — |
| G | HPMC | 100,000 | 23 | 8 | — | — | — | — |
| H | MC | 100 | 30 | — | — | — | — | — |
| I | HPMC | 50 | 28 | 6 | — | — | — | — |
| J | HEEC | 80,000 | — | — | 39 | 14 | — | — |
| K | MC | 4 | 30 | — | — | — | — | — |
| L | HPMCAS | 3 | 23 | 7 | — | — | 8 | 14 |

*1HPMC: hydroxypropyl methyl cellulose HEMC: hydroxyethyl methyl cellulose MC: methyl cellulose HPC: hydroxypropyl cellulose HEEC: hydroxyethyl ethyl cellulose HPMCAS: hydroxypropyl methyl cellulose acetate succinate
*2Viscosity is a measurement at 20° C. of a 2 wt % aqueous solution by Ubbelohde's viscometer according to JIS K2283-1993
*3MeO: methoxyl HPO: hydroxypropoxyl HEO: hydroxyethoxyl EtO: ethoxyl

TABLE 3

| Example | Solvent Type | Solvent b.p. (° C.) | Cellulose ether Type | Cellulose ether Concentration (wt %) | Heating temp. (° C.) | Chip-forming temp. (° C.) | Form before admission | Purging temp. (° C.) |
|---|---|---|---|---|---|---|---|---|
| 19 | propylene glycol | 188 | A | 60 | 160 | 30 | chip | 160 |
| 20 | propylene glycol | 188 | B | 40 | 170 | 30 | chip | 170 |
| 21 | propylene glycol | 188 | C | 50 | 170 | 30 | chip | 170 |
| 22 | propylene glycol | 188 | D | 70 | 150 | 30 | chip | 150 |
| 23 | propylene glycol | 188 | E | 80 | 140 | 30 | chip | 150 |
| 24 | propylene glycol | 188 | F | 70 | 120 | 25 | chip | 150 |
| 25 | ethylene glycol | 197 | A | 60 | 170 | 20 | chip | 170 |
| 26 | ethylene glycol | 197 | C | 60 | 180 | 0 | chip | 180 |

TABLE 3-continued

| Example | Solvent Type | b.p. (°C.) | Cellulose ether Type | Concentration (wt %) | Heating temp. (°C.) | Chip-forming temp. (°C.) | Form before admission | Purging temp. (°C.) |
|---|---|---|---|---|---|---|---|---|
| 27 | diethylene glycol | 245 | A | 60 | 210 | 10 | chip | 210 |
| 28 | diethylene glycol | 245 | B | 40 | 210 | 30 | chip | 210 |
| 29 | 1,3-propane diol | 214 | H | 70 | 180 | 30 | chip | 180 |
| 30 | glycerol | 290 | G | 50 | 260 | 35 | chip | 260 |
| 31 | tripropylene glycol methyl ether | 243 | J | 70 | 210 | 30 | chip | 210 |
| 32 | ethyl glycolate | 160 | J | 70 | 130 | 30 | chip | 150 |
| 33 | monoethanolamine | 172 | I | 70 | 140 | 20 | chip | 150 |
| 34 | diethanolamine | 269 | D | 60 | 240 | 24 | chip | 230 |
| 35 | propylene glycol | 188 | D:K = 60:10 | 70 | 170 | 30 | chip | 170 |
| 36 | propylene glycol | 188 | D:L = 0:10 | 70 | 150 | 30 | chip | 160 |

Japanese Patent Application No. 2012-256452 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for cleaning an extrusion or injection molding machine by removing a contaminant therefrom, comprising the step of extrusion or injection molding a purging composition through the machine at a temperature equal to or higher than the melting point of the contaminant,
said purging composition comprising a cellulose ether and at least one solvent selected from the group consisting of a water-soluble polyhydric alcohol, polyhydric alcohol ether, polyhydric alcohol ester, and ethanolamine.

2. The method of claim 1, wherein the concentration of the cellulose ether in the solvent is at least 10% by weight.

3. The method of claim 1, wherein the purging composition is prepared by heating and melting the cellulose ether in the solvent, cooling the solution for solidification, and grinding the solid.

4. The method of claim 1, wherein the cellulose ether is an alkyl cellulose, hydroxyalkyl cellulose, hydroxyalkyl alkyl cellulose or stearyl ether thereof, or cellulose-based enteric substrate.

5. The method of claim 1, wherein the water-soluble polyhydric alcohol is ethylene glycol, propylene glycol, diethylene glycol, dipropylene glycol, 1,3- propanediol or glycerol.

6. The method of claim 1, wherein the water-soluble polyhydric alcohol ether is ethylene glycol ethyl ether or tripropylene glycol methyl ether.

7. The method of claim 1, wherein the water-soluble polyhydric alcohol ester is ethylene glycolate, glyceryl monoacetate or glyceryl diacetate.

8. The method of claim 1, wherein the water-soluble ethanolamine is monoethanolamine or diethanolamine.

* * * * *